Dec. 16, 1924.
G. A. BELDING
METAL SHINGLE
Filed May 27, 1922
1,519,350
6 Sheets-Sheet 1
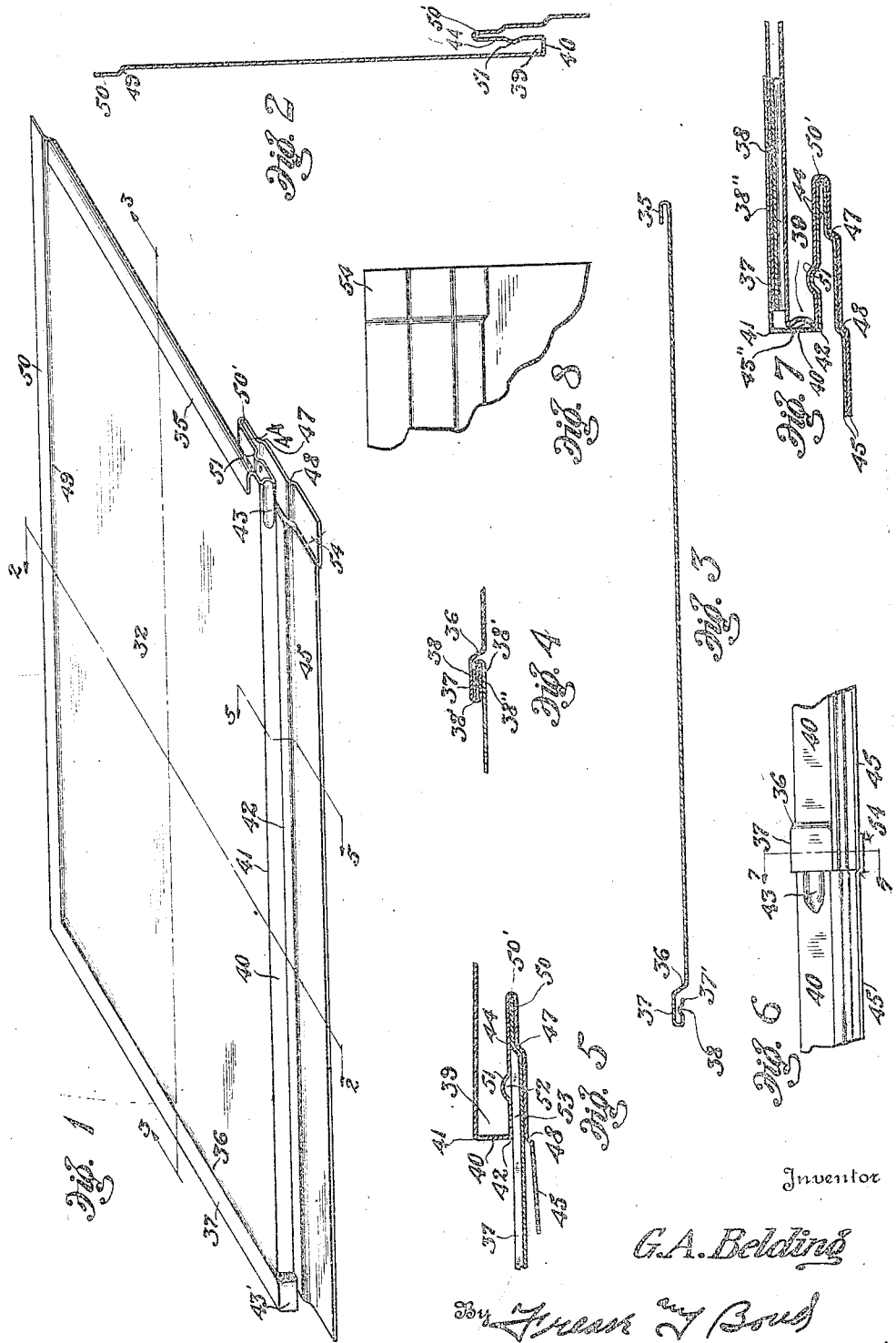

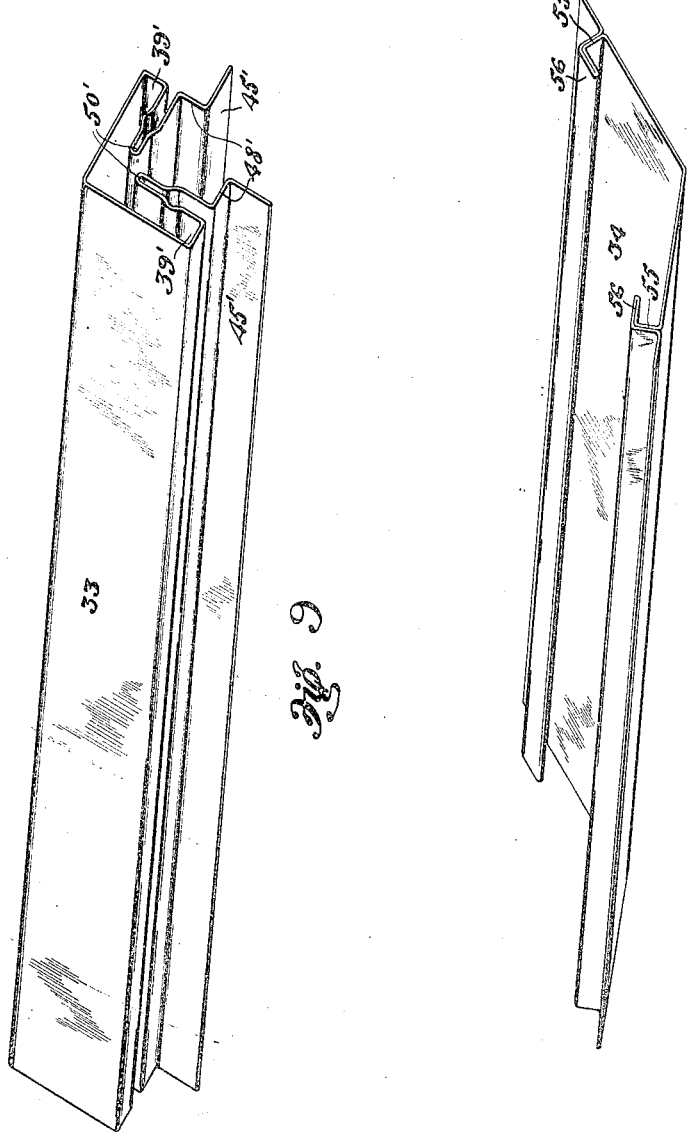

Dec. 16, 1924.
G. A. BELDING
METAL SHINGLE
Filed May 27, 1922
1,519,350
6 Sheets-Sheet 3
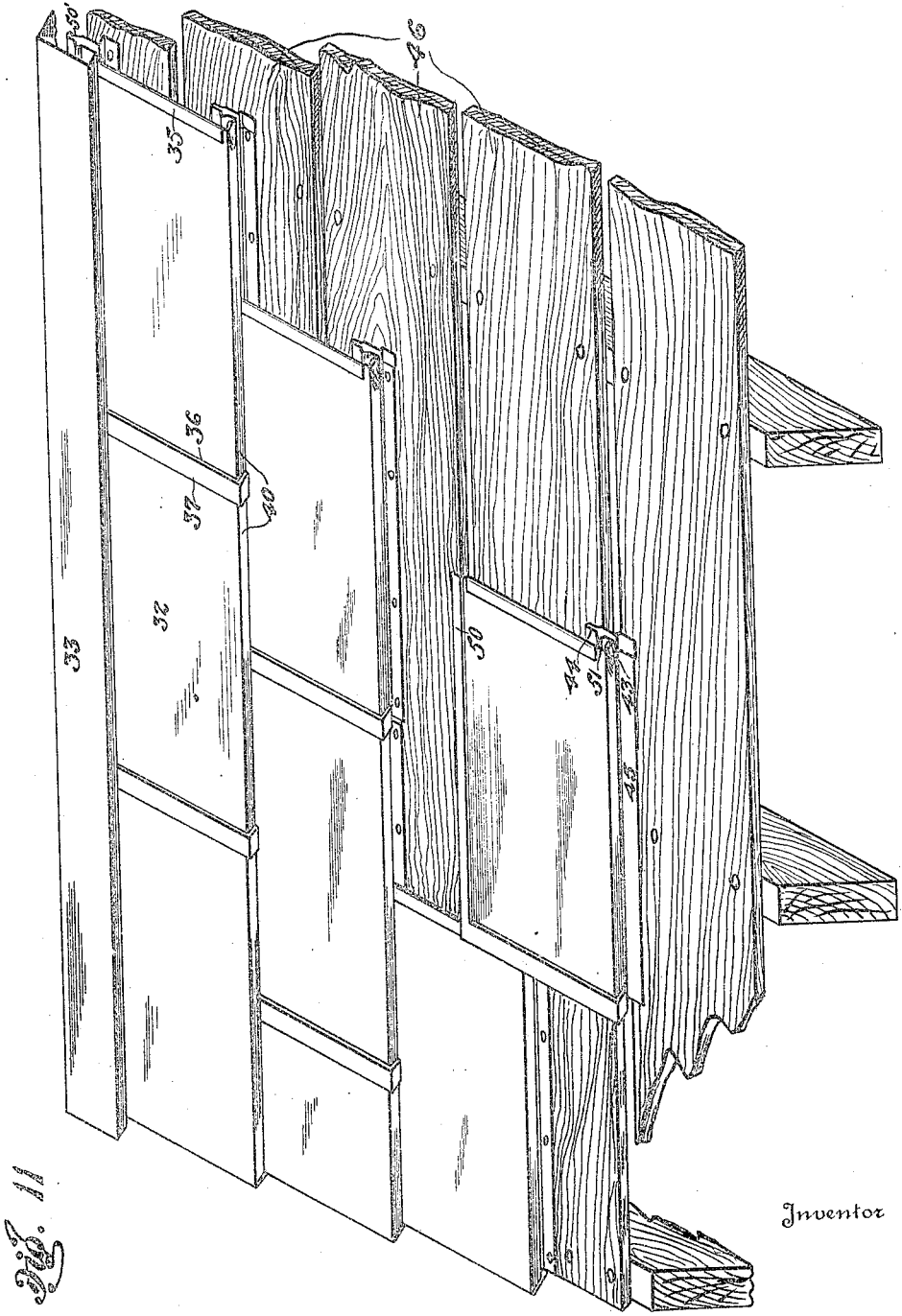
Inventor
G. A. Belding
By Frease and Bond, Attorneys Dec. 16, 1924.
G. A. BELDING
1,519,350
METAL SHINGLE
Filed May 27, 1922
6 Sheets-Sheet 4
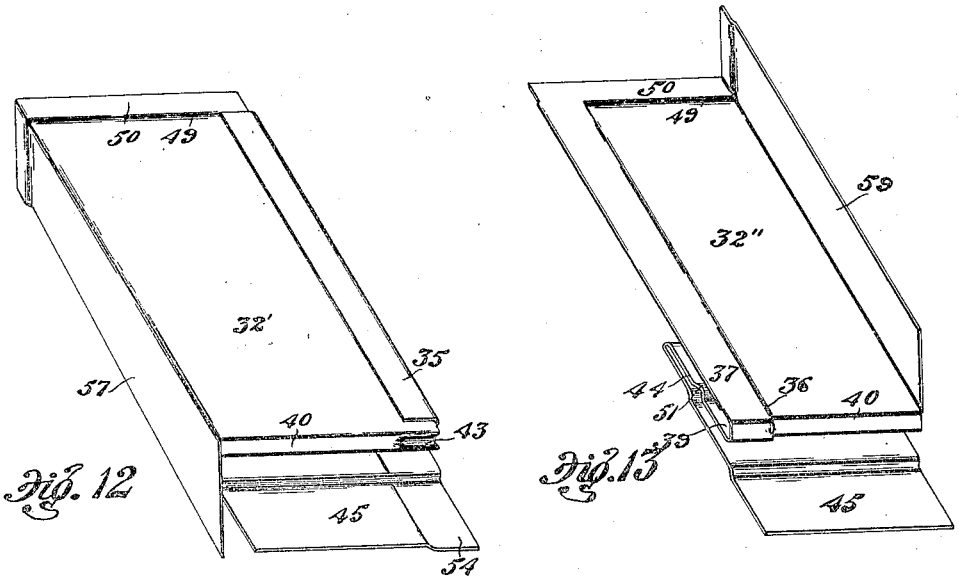
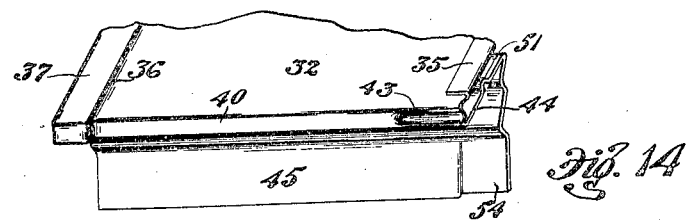
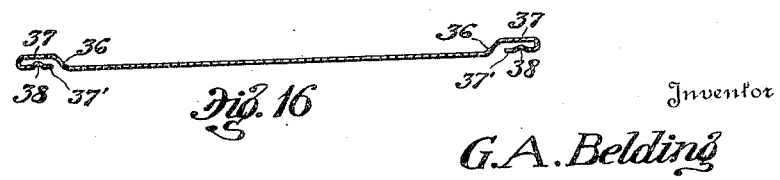
Inventor
G. A. Belding
By Frease and Bond
Attorneys Dec. 16, 1924.  
G. A. BELDING  
METAL SHINGLE  
Filed May 27, 1922  
1,519,350  
6 Sheets-Sheet 5
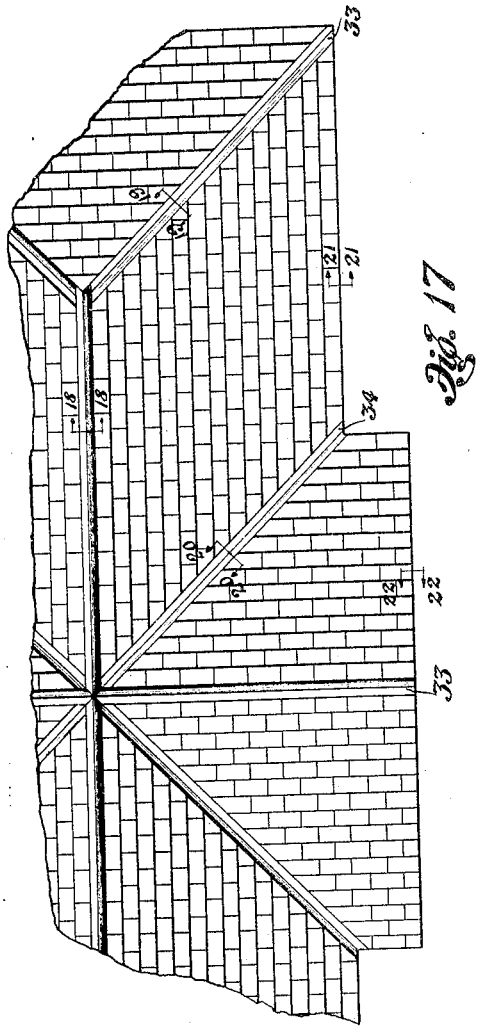
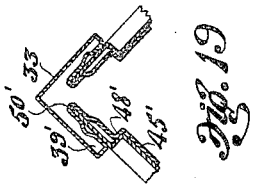
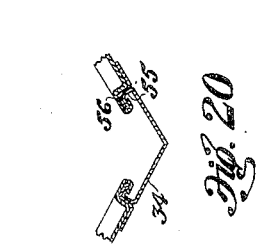
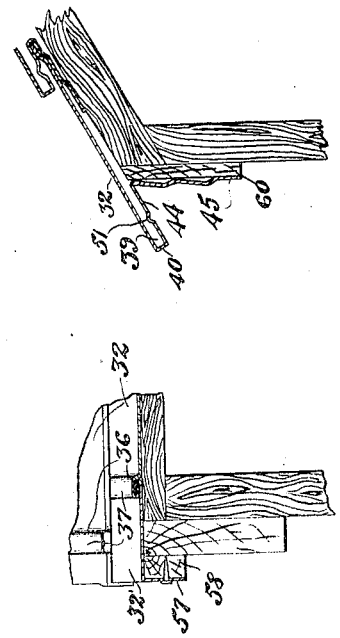
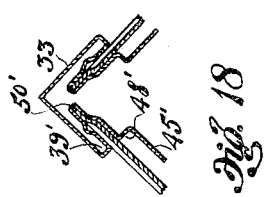
Inventor  
G. A. Belding  
By Freese and Bond  
Attorneys Dec. 16, 1924.
G. A. BELDING
METAL SHINGLE
Filed May 27, 1922          6 Sheets-Sheet 6
1,519,350
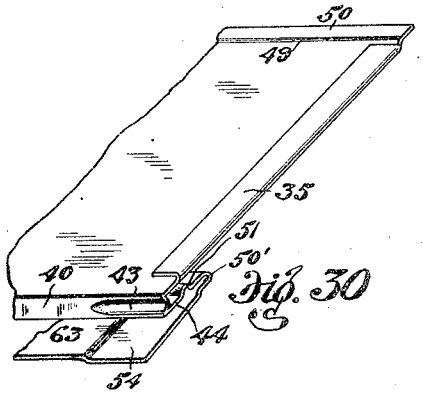
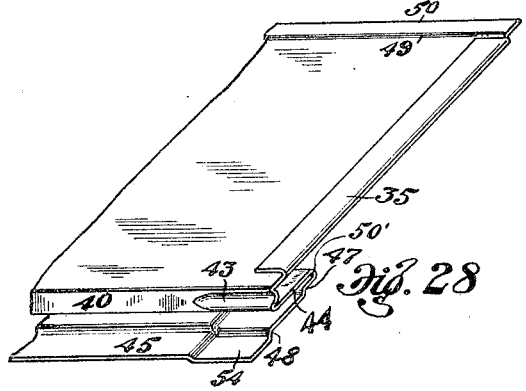
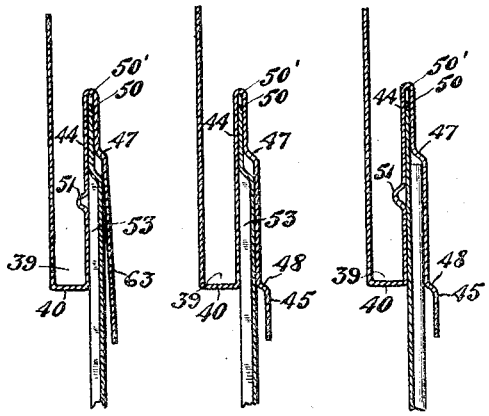
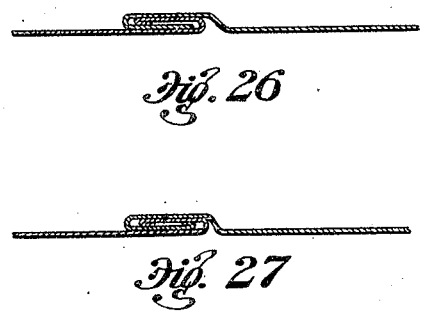
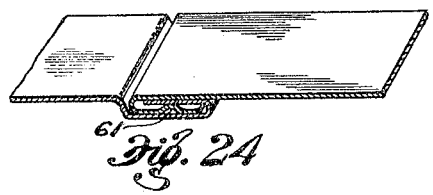
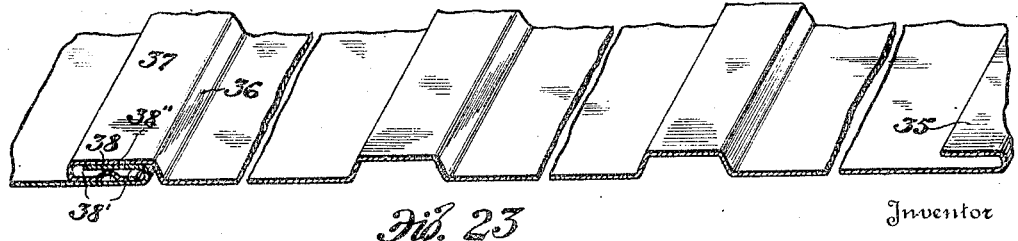
Inventor
G. A. Belding
By Fresse and Breed
Attorneys Patented Dec. 16, 1924.

1,519,350

UNITED STATES PATENT OFFICE.

GEORGE A. BELDING, OF BILLINGS, MONTANA.

METAL SHINGLE.

Application filed May 27, 1922. Serial No. 564,240.

*To all whom it may concern:*

Be it known that I, GEORGE A. BELDING, a citizen of the United States, residing at Billings, in the county of Yellowstone and State of Montana, have invented new and useful Improvements in Metal Shingles, of which the following is a specification.

The invention relates to shingles made of sheet metal; and the object of the improvement is to provide a form of shingle for universal use, with corresponding ridge and hip copings, and a formed valley.

Another object of the improvement is to form end and side joints so that a shingle can be applied to a roof from the top or ridge of a roof, downward to a valley or the lower edge or eaves thereof; and to provide means in the joints for trapping and carrying off condensation or moisture from the underside of the shingle, and to prevent the entrance of water by capillary attraction or otherwise from the outer side of the shingle.

Further objects of the improvement are to form the shingle so that verge or flashing flanges can be readily bent upon either side thereof, and so that the shingle can be readily mitered on either side for joining with a hip coping or a formed valley, and can also be bent at its lower end to cover the eaves board and form an eaves projecting thereover.

A preferred form of the invention, and sundry modifications thereof, are illustrated in the accompanying drawings, forming part hereof, in which—

Figure 1 is a detached perspective view of a single shingle;

Fig. 2, a longitudinal section of same, on line 2—2, Fig. 1;

Fig. 3, a transverse section of same, on line 3—3, Fig. 1;

Fig. 4, a fragmentary cross section as on line 3—3, Fig. 1, showing the side joint between adjoining shingles;

Fig. 5, a fragmentary section, as on line 5—5, Fig. 1, showing the joint between the upper and lower ends of adjoining shingles, intermediate side joints thereof;

Fig. 6, a lower end view of a side joint between adjoining shingles;

Fig. 7, a fragmentary section on line 7—7, Fig. 6, showing the overlapping butt ends of adjoining shingles;

Fig. 8, a fragmentary under side plan of one corner of the butt end of a shingle;

Fig. 9, a detached perspective view of a section of ridge or hip coping for use with the improved shingle;

Fig. 10, a detached perspective view of a formed valley for use with the improved shingle;

Fig. 11, a fragmentary perspective view of a roof, showing the method of applying the improved shingles thereto;

Fig. 12, a detached perspective view of an improved shingle, showing a verge flange formed on one side thereof;

Fig. 13, a detached perspective view of the improved shingle, showing a flashing flange formed on one side thereof;

Fig. 14, a fragmentary perspective view of the butt end of the shingle, showing the butt tongue bent downward to conform to an eaves board;

Figs. 15 and 16 are transverse sections, showing modified arrangements of side joint flanges;

Fig. 17, a fragmentary diagrammatic plan of a roof, showing shingles, ridge and hip coping, and formed valleys thereon;

Fig. 18, a fragmentary section on line 18—18, Fig. 17, showing joints between the upper ends of shingles and a ridge coping;

Fig. 19, a fragmentary section on line 19—19, Fig. 17, showing joints between mitered sides of shingles and a hip coping;

Fig. 20, a fragmentary section on line 20—20, Fig. 17, showing a joint between mitered sides of shingles and a formed valley;

Fig. 21, a fragmentary section on line 21—21, Fig. 17, showing the attaching flange of a shingle bent downward upon an eaves board;

Fig. 22, a fragmentary section on line 22—22, showing a verge flange bent downward upon a verge board;

Fig. 23, a fragmentary transverse perspective section showing longitudinal ribs, giving the appearance of side joint ribs;

Fig. 24, a fragmentary perspective section of a modified form of side joint;

Fig. 25, a fragmentary section of an end joint;

Figs. 26 and 27, are fragmentary sections of other modified side joints;

Fig. 28, a fragmentary perspective view of a modified form of the inner butt wall;

Fig. 29, a fragmentary section showing an end joint made by the same;

Fig. 30, a fragmentary perspective view of a modified form of attaching flange;

Fig. 31, a fragmentary section showing an end joint made by the same.

Similar numerals refer to similar parts throughout the drawings.

A roof can be completely covered by a standard form of a shingle 32, a standard form of ridge or hip coping 33, and in case of need a formed valley 34; which are preferably shaped as shown in Figs. 1, 9 and 10.

Each shingle 32 is provided with on open folded flange 35 along one side, and may be off-set at 36 at the other side to form a raised rib 37 which is provided with an open folded flange 37'. The open flanges are adapted to be interengaged by sliding endwise, one within the other, as shown in the lower middle portion of Fig. 11, and they may also be engaged sidewise by slightly springing one flange within the other. When so engaged, the body portions of adjoining shingles lie in the same plane, as shown in Fig. 4.

A corrugated bead 38 is preferably formed longitudinally in one of the flanges, which not only spaces the flanges apart to form longitudinal ports 38' along each edge side of the bead, but forms a longitudinal port 38" within the corrugation; which ports serve to break the contact and trap any water which may enter the joint by capillary attraction, and conduct the same downward to the lower end of the joint. A similar result may be accomplished by the modified flanges, shown in Figs. 26 and 27, wherein a folded bead is formed on the edge of one or both flanges which serve to space the flanges apart and form a longitudinal port between the flanges.

The lower end of each shingle is bent first downward from the face thereof, and thence rearward or upward substantially parallel to the body, which bends form a U-shaped channel 39 serving as a drainage trough extending transversely within the square butt end 40 of the shingle. These bends may be and preferably are made to form square angles 41 and 42, in semblance of the butt end of an ordinary wooden shingle.

The transverse drainage trough in the butt end of the shingle receives and carries off any water which may be conducted downward by the draining port in the side joint, and also any water which may result from condensation on or otherwise finds its way to the underside of the shingle.

A short indentation 43 is preferably provided at the underlapping side of the butt end, and a corresponding protrusion 43' is pressed outward at the overlapping side of the butt end, thereby forming a channel 43" which serves as an outlet for water which may flow from the lower end of the side joint.

The inner wall 44 of the butt end of the shingle is bent downward away from the body of the shingle, and thence forward a substantial distance beyond the butt end of the shingle to form a protruding flange 45, through which the shingle may be nailed or otherwise attached to a roof sheathing 46.

The attaching flange 45 is preferably provided with a downward off-set 47 adjacent to its upper end, and also another downward off-set 48 opposite the butt end of the shingle to support the same, to permit the protruding portion of the flange to lie flat upon the roof with space for the heads of nails and the remainder of the flange to assume proper position when the end joint is made.

The upper end of each shingle is provided with an outward off-set 49 spaced from the edge forming a raised tongue 50, which is adapted to enter the groove 50' formed by the outward bend of the connecting flange 45, and the off-set 49 at the base of the tongue is arranged to bear against the first off-set 47 in the attaching flange, as shown in Fig. 5.

When the end joints are assembled, which may be done by sliding the shingle endwise along a side joint, the rib 37 bears against and supports the inner wall of the butt end of the shingle. A transverse corrugation 51 convexed upward is provided in the inner wall 44 to form a port 52 which may extend entirely across the shingle, which serves to discharge to one side or the other of a joint rib, any water which may find its way by capillary attraction between the rib and the wall of the superposed shingle. It will be understood that the side joint ribs space the body of the lower shingle from the butt wall of the upper shingle, so as to form an open space 53 from which any water which may find its way under the butt will freely flow.

One end of the securing flange is provided with an off-set 54 spaced from the edge for properly receiving the overlapping end of the adjacent shingle when the end joint is assembled; and the flanges of the end and side joints are given sufficient clearance along each edge to accommodate an expansion or contraction of the sheet metal, which is supplemented in the end joints by a springing of the bends in the butt ends of the shingles.

The body of the ridge or hip coping 33 is made of any form desired for ornamental purposes, an ordinary V-form being shown, and each side portion is bent to form an interior trough 39', a groove 50' and a securing flange 45', substantially the same as the butt end of a shingle, so as to properly receive the tongue 50 on the upper end, or the mitered sides of a shingle; with the exception that the lower off-set 48' in the securing flange is preferably increased in depth to equal the depth of a butt end of a shingle, so that the mitered sides of a shingle can be bent upward and outward to enter the groove of a hip coping.

The body of the formed valley 34 is shaped as a flat inverted V, and adjacent to each side edge, it is provided with a longitudinal upstanding fold 55, which is bent inward to form an L-tongue 56, over and under which tongue the mitered side of a shingle may be bent to form a connecting joint. The upright stem of the flange is of a height equal to the butt end of a shingle and the securing flange off-set of the ridge or hip coping, so that the mitered side of a shingle can be bent upward and outward to form a joint.

Each transverse course of shingles is preferably started with a verge shingle 32′, having the bent butt portion of one end cut away at one side and a verge flange 57, as shown in Fig. 12, bent downward to fit against a verge board 58 of a roof, as shown in Fig. 22; and when a course terminates against an upright wall, the bent portions of the butt on the other side of a shingle are cut away and the body portion bent upward to form a body flange 59, as shown in Fig. 13, bent upward to abut the wall, which may be overlapped by an ordinary counterflashing.

At the lower edge of a roof, the securing flange on the butt end of a shingle is bent downward against and may be secured to an eaves board 60, so that the butt end of a shingle will form a projecting eaves, as shown in Fig. 21.

Shingles may be made either right or left handed with respect to the side joint flanges, and shingles may be provided with like flanges on each side as shown in Figs. 15 and 16, if desired, for connecting right or left hand shingles or for other assemblies; and also that the side joints may be formed with ribs, on the lower sides, as shown in Fig. 24, wherein the port 61 formed by the transverse corrugation traps water which may find its way upward by capillary attraction between the body of the lower shingle and the butt of the upper shingle.

Furthermore, the corrugation 51 in the wall of the butt end may be omitted, if desired, as shown in Figs. 28 and 29, and the lower off-set 48 in the attaching flange 63 may be omitted as shown in Figs. 30 and 31; or the side joint ribs may be formed on the lower side of the shingles, as shown in Fig. 24, in which latter event the body of the shingle is preferably provided with longitudinal drainage grooves which may be formed by inverted corrugations like the ribs shown in Fig. 23.

It will be understood that the shingles will be cut with miter angles to fit hip coping, formed valleys, etc., that coping sections may be made with edges formed exactly like the butt ends of the shingles; and that flashing sections may be made with edges formed like the butt end of shingles to joint with the upper ends of shingles.

I claim:

1. A sheet metal shingle or the like having an open folded flange on one side for engagement with a like flange on an adjoining shingle, there being a longitudinal corrugation on one flange to space the flanges apart and form a longitudinal draining port within the corrugation.

2. A sheet metal shingle or the like having an open folded flange on one side for engagement with a like flange on an adjoining shingle, there being a longitudinal corrugation on one flange to space the flanges apart and form longitudinal draining ports within and on each side of the corrugation.

3. A sheet metal shingle or the like having an open folded flange on one side, an adjoining shingle having an off-set rib with an open folded flange thereon adapted for engagement with the first mentioned flange, there being a longitudinal corrugation on one flange to space the flanges apart and form a longitudinal draining port within the corrugation.

4. A sheet metal shingle or the like having one end bent first downward and then rearward to form a square butt and a transverse drainage trough and then bent under and forward to form an attaching flange protruding beyond the butt end, there being a transverse off-set in the attaching flange.

5. A sheet metal shingle or the like having one end bent first downward and then rearward to form a square butt and a transverse drainage trough and then bent under and forward to form an attaching flange protruding beyond the butt end, there being a plurality of transverse off-sets in the attaching flange, one adjacent to its upper end and the other opposite the butt end of the shingle.

6. A sheet metal shingle or the like having one end bent first downward and then rearward to form a square butt and a transverse drainage trough and then bent under and forward to form an attaching flange protruding beyond the butt end, there being a corrugation forming a transverse drainage port in the under side of the inner wall of the butt end of the shingle.

7. A sheet metal shingle or the like having one end bent first downward and then rearward to form a square butt and a transverse drainage trough and then bent under and forward to form an attaching flange protruding beyond the butt end, there being a transverse off-set in the attaching flange, and the tongue on the other end of a shingle adapted for engagement in a groove formed between the butt wall and the attaching flange.

8. A sheet metal shingle or the like having one end bent first downward and then rearward to form a square butt and a transverse drainage trough and then bent under and forward to form an attaching flange protruding beyond the butt end, there being a transverse off-set in the attaching flange, and a tongue on the other end of the shingle adapted for engagement in a groove formed between the butt wall and the attaching flange, there being an off-set in the tongue for abutment with the off-set in the flange.

9. A sheet metal shingle or the like having an open folded flange on one side for engagement with a like flange on a laterally adjoining shingle, there being a longitudinal corrugation on one flange to space the flanges apart and form a longitudinal draining port within the corrugation; and having one end bent first downward and then rearward to form a square butt and a transverse trough for receiving drainage from the said draining port, there being a tongue on the other end for engagement in the groove between the butt wall and attaching flange of an endwise adjoining shingle.

GEORGE A. BELDING.